Dec. 28, 1937.  E. C. HORTON  2,103,973
WINDSHIELD WIPER
Filed March 27, 1935
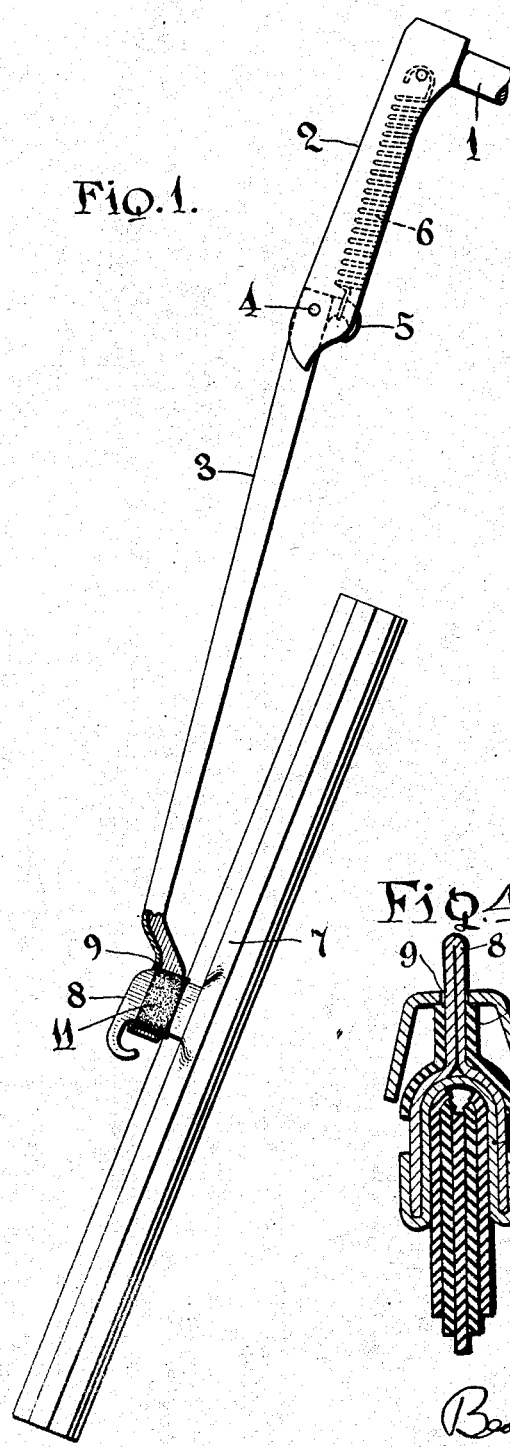
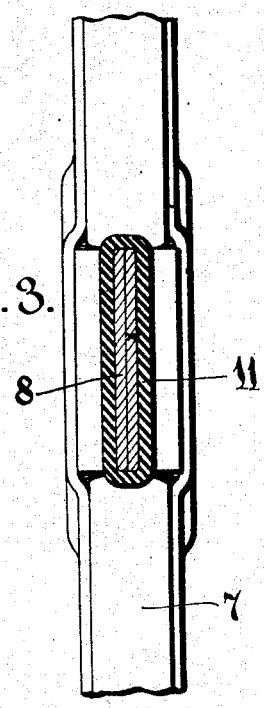
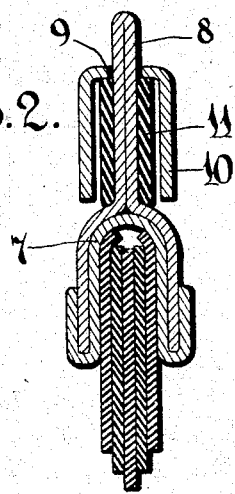
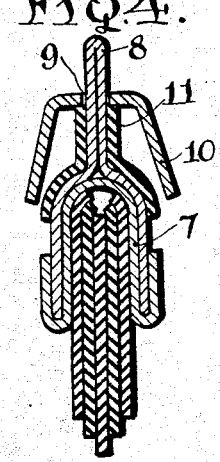
INVENTOR
Erwin C. Horton,
BY
Bean Brooks Buckley & Bean
ATTORNEYS Patented Dec. 28, 1937

2,103,973

UNITED STATES PATENT OFFICE 2,103,973

WINDSHIELD WIPER

Erwin C. Horton, Hamburg, N. Y., assignor to Trico Products Corporation, Buffalo, N. Y.

Application March 27, 1935, Serial No. 13,320

8 Claims. (Cl. 15—250)

This invention relates to windshield wipers and has particular reference to the mounting of the wiper on its carrying arm.

In the windshield cleaner heretofore used on motor vehicles, the wiper, or blade as it is sometimes referred to, has been mounted on its carrying arm in a manner to provide for a slight amount of rocking movement so that the wiper will trail the arm across the glass at an angle and thereby avoid chattering of the wiper on the glass. While the wiper is at rest, the wiping edge becomes set in a bent position so that for subsequent wiping the efficiency is somewhat impaired. Furthermore, at the beginning of each wiper stroke, the arm rocks the wiper on its wiping edge so as to dispose such edge in trailing relation. The wiper and its carrying arm are composed of metal parts and consequently at the beginning of each stroke, and when the wiper is turned over by its arm, there is a certain amount of noise due to the metal parts clicking together in their movement limiting function, and a marring of the finish on such parts.

The present invention has for its object to provide a windshield cleaner which is quiet and efficient in its operation, and further to provide means tending to bring the wiper to a position substantially normal to the glass when the cleaner is in parked position.

In the accompanying drawing, Fig. 1 is an elevation, partly in section, of a wiper and its carrying arm, depicting the present invention in one embodiment;

Fig. 2 is a transverse sectional view through the wiper-arm connection;

Fig. 3 is a longitudinal section through the attaching part of the wiper; and

Fig. 4 is a modified showing of the invention.

Referring more particularly to the drawing, the numeral 1 designates the actuating shaft of the cleaner to which the wiper carrying arm is attached. The arm has its outer end resiliently urged toward the windshield glass and for this reason, the arm construction may, in accordance with the present disclosure, comprise a fixed inner section 2, which is secured to the actuating shaft 1, and a pivotally mounted outer section 3, articulated to the inner section by pivot pin 4. The section 3 is provided with a bell crank extension 5 to which one end of the coil spring 6 is attached. The opposite end of the spring is anchored under tension to the inner section 2 and may be conveniently housed within the latter section which is hollowed for that purpose. The spring therefore urges the outer end of the section 3 toward the windshield glass and exerts sufficient pressure on the wiper 7 to efficiently wipe the glass.

The wiper is provided with an attaching fin 8 for engagement in the slot 9 formed in the outer or free end of the arm section 3, the fin and blade or wiper constituting a wiper unit. This general type of arm and wiper connection is disclosed in Patent No. 1,946,073, granted February 6th, 1934 to Henry Hueber and myself, jointly. Means are provided to limit the rocking of the wiper unit under the arm, the means herein depicted comprising positioning flanges 10 extending downwardly from the arm on opposite sides of the fin to alternately contact therewith, or the wiper, in defining the extent of the rocking movement of the wiper, the slot 9 loosely receiving the fin to permit of such rocking action.

As the windshield cleaner begins a stroke, the blade rocks over on its wiping edge until arrested by the trailing stop flange 10 striking against the wiper or its mounting fin. These metal parts, as they contact, produce a clicking sound which is accentuated or amplified by reason of the spring pressure under which the outer end of the arm is rocking. This constant striking action tends to break and mar the finish on the parts. To silence such contact of the parts and preserve their finish, a buffer 11 is interposed between such parts.

According to the present embodiment the buffer takes the form of a collar which is preferably of rubber and may be stretched over the fin so as to securely hug the latter against unauthorized displacement. The height of the collar on the fin is such as to support the arm toward the outer end of the fin and still provide sufficient surface coverage to have the free edges of the stop flanges 10 engaged therewith. Such relationship is clearly illustrated in the transverse sectional view, Fig. 2. The collar, however, may be shortened on the fin and extended down over the sides of the blade, (Fig. 4) if desired. Therefore as the blade is rocked, the stop flanges will contact with the buffer collar and thus have a silent and protective engagement with the blade during operation of the windshield cleaner.

Referring particularly to Fig. 2, it will be observed that the arm portion about the slot 9 seats upon the upper edge of the buffer collar and exerts a downward pressure thereon. Such pressure is yieldingly resisted by the rubber buffer and therefore when the windshield cleaner has been moved to a parked or inoperative position, and because of the inclined disposition of the wiper which will cause a greater downward compression of the collar by the arm on the upper side of the fin, the rubber collar will tend to expand on such compressed side and in so doing, will tend to self-aright or bring the wiper into a position more or less normal to the windshield glass. This normalizing tendency and action of the rubber buffer is assisted obviously by the vibration set up in the motor vehicle incidental to its travel and will continue until its pressure on opposite sides of the fin against the carrying arm is substantially equalized.

What is claimed is:

1. A windshield cleaner having a wiper, a wiper carrying arm urging the wiper against the windshield glass, said wiper being connected to the arm for lateral rocking movement beneath the arm and said arm having oppositely disposed stop parts freely straddling the wiper for determining the extent of rocking movement, and a rubber buffer supporting the arm on the wiper and disposed between said stop parts and said wiper for cushioning and silencing the contacts therebetween during such rocking movement.

2. A windshield cleaner having a wiper, a wiper carrying arm connected to the wiper for holding it against the windshield glass, said arm having wiper straddling stop parts spaced apart to permit limited rocking movement of the wiper, and a rubber buffer having spaced parts supporting the arm at spaced points on the wiper and interposed between said stop parts and said wiper for cushioning the contacts therebetween during such rocking movement, said buffer parts being alternately compressed by the arm upon succeeding strokes of the latter and acting to urge the wiper to a normal position when the latter is at rest.

3. A windshield cleaner having a wiper unit including an attaching fin, a wiper carrying arm having a slot receiving the fin, said arm having stop parts arranged at opposite sides of the fin in outwardly spaced relation, and resilient means interposed between the stop parts and the wiper unit for cushioning the angular rocking of the latter, said means resiliently supporting the arm on the wiper unit.

4. A windshield cleaner having a wiper provided with an attaching fin, a wiper carrying arm having a slot loosely receiving the fin to permit rocking of the wiper, said arm also having spaced stop parts straddling the fin and serving to determine the extent of rocking of the wiper, means urging the arm toward the wiper, and cushioning means carried by the fin on opposite sides thereof to be engaged by said stop parts during the rocking movement of the wiper.

5. A windshield cleaner having a wiper provided with an attaching fin, a wiper carrying arm having a slot receiving the fin for rocking movement, said arm urging the wiper toward the windshield glass, and a rubber collar snugly embracing the fin and compressible thereon by the arm in transmitting the pressure from said arm to the wiper, said arm having stop parts engageable with the collar to determine the extent of rocking movement.

6. A window cleaner having a wiper member, a wiper carrying arm member urging the wiper member against the window glass, said wiper member being mounted on the arm member for lateral rocking movement relative to the arm member, one of said members having a stop part for alternate contact with spaced parts on the other of said members for limiting the extent of the rocking movement, and a resilient buffer encircling said stop part for coacting between the two members for cushioning and silencing the contacts therebetween during such rocking movement.

7. A window cleaner having a wiper member, a wiper carrying arm member urging the wiper member against the window glass, said wiper member being mounted on the arm member for lateral rocking movement relative to the arm member, one of said members having a stop part for alternate contact with spaced parts on the other of said members for limiting the extent of the rocking movement, and a resilient buffer interposed between said spaced parts on the other of said members and said stop part for coacting between the two members in cushioning and silencing the contacts therebetween during such rocking movement.

8. A wiper unit for windshield cleaners comprising a wiper body and an attaching fin fixed thereto and extending from the back thereof, said attaching fin being adapted to connect the unit to a wiper carrying arm having spaced straddling stop parts for determining the extent of rocking movement of the wiper unit in operation, and resilient means carried by the unit for supporting an attached arm and serving to cushion the contact with the stop parts.

ERWIN C. HORTON.